US009860951B1

(12) United States Patent
Chen et al.

(10) Patent No.: US 9,860,951 B1
(45) Date of Patent: Jan. 2, 2018

(54) SYSTEMS AND METHODS FOR BALANCING CURRENT AMONG LIGHT-EMITTING DIODE BOARDS

(71) Applicant: ABL IP Holding LLC, Decatur, GA (US)

(72) Inventors: Feng Chen, Hoffman Estates, IL (US); Towfiq Chowdhury, Lake Forest, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/581,617

(22) Filed: Apr. 28, 2017

(51) Int. Cl.
*H05B 33/08* (2006.01)
*H05B 37/02* (2006.01)
*G05F 5/00* (2006.01)
*G05F 3/16* (2006.01)
*F21Y 115/15* (2016.01)

(52) U.S. Cl.
CPC ......... *H05B 33/0845* (2013.01); *H05B 37/02* (2013.01); *F21Y 2115/15* (2016.08); *G05F 3/16* (2013.01); *G05F 5/00* (2013.01); *H05B 33/0827* (2013.01); *Y02B 20/347* (2013.01)

(58) Field of Classification Search
CPC ............... H05B 33/08; H05B 33/0827; H05B 33/0845; H05B 37/02; H05B 37/0227; F21Y 2115/15; Y02B 20/347; G05F 3/16; G05F 5/00
USPC .... 315/151–158, 185 R, 224–226, 291, 307, 315/308, 312
See application file for complete search history.

(56) References Cited

U.S. PATENT DOCUMENTS

| 7,380,961 B2* | 6/2008 | Moriyama .......... F21V 19/0025 257/676 |
| 2011/0175548 A1* | 7/2011 | Nishimura ................ F21K 9/00 315/294 |

OTHER PUBLICATIONS

"LED Troubleshooting—Wire and Wiring Issue," http://www.ecolocityled.com/category/led_troubleshoot_wire, Nov. 16, 2012, 3 pages.
"Utility guide to choose the right led strip lights", http://www.saving-star.com/utility-guide-to-choose-the-right-led-strip-lights/, Apr. 30, 2015, 19 pages.

* cited by examiner

*Primary Examiner* — Jimmy Vu
(74) *Attorney, Agent, or Firm* — Kilpatrick Townsend & Stockton, LLP (57) ABSTRACT

A lighting system includes various LED boards. The LED boards are connected to a power source via an LED driver that regulates power from the power source to the LED boards. The LED driver includes a positive output and a negative output. The positive output of the LED driver is connected to a positive connection point of a first LED board and the negative output of the LED driver is connected to a negative connection point of a last LED board to distribute power or current approximately evenly across the LED boards. Distributing power or current approximately evenly across the LED boards or balancing current through the LED boards can cause the brightness or intensity of various LEDs in the lighting system to be approximately the same.

20 Claims, 5 Drawing Sheets

SYSTEMS AND METHODS FOR BALANCING CURRENT AMONG LIGHT-EMITTING DIODE BOARDS

TECHNICAL FIELD

The present disclosure relates generally to balancing current among light-emitting diode boards. More specifically, but not by way of limitation, this disclosure relates to systems and methods for configuring multiple light-emitting diode boards driven by a single LED driver to balance current among the light-emitting diode boards.

BACKGROUND

Some lighting systems that include multiple light-emitting diode ("LED") boards use a single LED driver to power the multiple LED boards. The lighting systems can include one or more LEDs on each LED board. Various components of the lighting system (e.g., the individual LEDs, conductive traces on the LED boards, wires connecting the various LED boards, etc.) can each have an impedance. Differences or variations in the impedances of the components of the lighting system may negatively affect the system. For example, the differences in the impedances may cause variations in the current passing through the lighting system, which can result in variations in the brightness levels of LEDs in the system.

Some lighting systems may use a splitter that is connected to the LED driver to split power output from the LED driver among the various LED boards. Such lighting systems may require a number of connectors, wires, and other components to connect the LED driver to the individual LED boards, which may increase the cost or complexity of the system.

Existing lighting systems have limitations as they do not mitigate or obviate the effects of variations in the impedances of components of the lighting system or they involve using additional components to split power output from the LED driver, which can increase the cost and complexity of manufacturing the lighting system. For example, existing lighting systems may include a single LED driver connected to an LED board of the lighting system and the LED board is then connected to another LED board. In these systems, variations in the impedances of wires, connectors, or conductive traces in the system for the different LED boards can cause each LED board to produce a different intensity or brightness due to differences in current. As another example, existing lighting systems may include a single LED driver connected to each LED board in the system via a splitter. Such systems can involve using additional connectors to connect the LED driver to each LED board, which can increase the complexity and cost of manufacturing the system.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

A lighting system can include various light-emitting diode ("LED") boards that each include at least one LED. The LEDs on each LED board can be arranged in series, in parallel, or a combination of series and parallel arrangements. The LED boards are connected to a power source via an LED driver that regulates power from the power source to the LED boards. In this example, the LED driver includes a first output and a second output. The first output of the LED driver is connected to a connection point of a first LED board and the second output of the LED driver is connected to a connection point of a last LED board. As an example, a positive output of the LED driver is connected to a positive connection point of the first LED board and a negative output of the LED driver is connected to a negative connection point of the last LED board. In this example, two or more LED boards can be connected between the first output and second output of the LED driver. Connecting the positive output of the LED driver to the positive connection point of the first LED board and connecting the negative output of the LED driver to the negative connection point of the last LED board can allow power from the LED driver to be distributed approximately evenly across the LED boards. For example, connecting the positive output of the LED driver to the positive connection point of the first LED board and connecting the negative output of the LED driver to the negative connection point of the last LED board can balance the current through the various LED boards in the system. Distributing power approximately evenly across the LED boards or balancing the current through the LED boards can improve the uniformity of the brightness or intensity of various LEDs in the lighting system. In some examples, distributing power approximately evenly across the LED boards or balancing current through the LED boards as described above can reduce a cost of manufacturing the lighting system. For example, connecting the LED driver and the LED boards as described above can reduce or obviate the need to bin or group the LEDs of the system when manufacturing the lighting system.

In some examples, connecting the positive output of the LED driver to the positive connection point of the first LED board and connecting the negative output of the LED driver to the negative connection point of the last LED board to distribute power evenly across the LED boards can obviate the use of a splitter in the lighting system.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

DETAILED DESCRIPTION

Certain aspects and features of the present disclosure are directed to systems and methods for configuring multiple light-emitting diode ("LED") boards driven by a single LED driver to balance current among the LED boards. A lighting system can include various LED boards that each include at least one LED. The LEDs on each LED board can be arranged in series, in parallel, or a combination of series and parallel arrangements. In some examples, the various LED boards can be configured in substantially the same manner. For example, each LED board can include substantially the same number of LEDs and the LEDs on each LED board can be arranged in substantially the same manner. In another example, the various LED boards can have different configurations. For example, each LED board can have a different number of LEDs or the LEDs on each LED board can be arranged differently. The various LED boards can be connected to an LED driver that is connected to a power source. The LED driver can provide power to each of the LED boards by regulating power from the power source. The LED driver includes a positive output and a negative output. The positive output of the LED driver is connected to a positive input or output of a first LED board and the negative output of the LED driver is connected to a negative input or output of a last LED board. In this example, additional LED boards can be connected between the first LED board and the last LED board. This arrangement can allow power from the LED driver to be distributed approximately evenly across the LED boards. For example, connecting the positive output of the LED driver to the positive input or output of the first LED board and connecting the negative output of the LED driver to the negative input or output of the last LED board can balance the current through the various LED boards in the system. Distributing the power approximately evenly across the LED boards or balancing the current through the LED boards can improve the uniformity of the brightness or intensity of various LEDs in the lighting system (e.g., by making the brightness or intensity of the various LEDs to be approximately the same). In some examples, the various LED boards can be connected such that the current through the various LED boards is balanced by balancing the impedance through the various LED boards of the lighting system.

In some examples, connecting the positive output of the LED driver to the positive input or output of the first LED board and connecting the negative output of the LED driver to the negative input or output of the last LED board to distribute power evenly across the LED boards can obviate the use of a splitter in the lighting system.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

In the interest of clarity, not all of the routine features of the examples described herein are shown and described. It will, of course, be appreciated that in the development of any such actual implementation, numerous implementation-specific decisions must be made in order to achieve specific goals, such as compliance with application- and business-related constraints, and that these specific goals will vary from one implementation to another.

Figure 4:
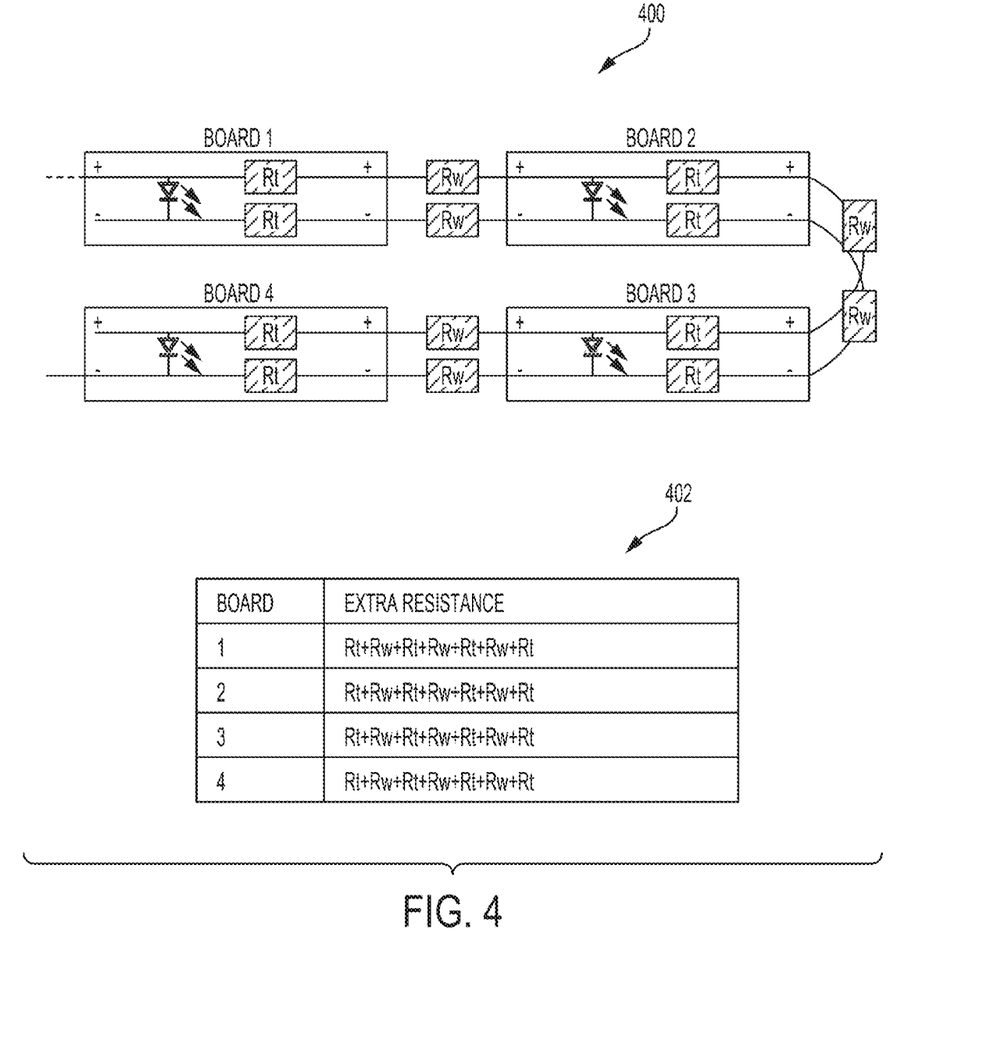
FIG. 4 shows an example of a light-emitting diode lighting system, along with a table showing a power bus impedance of the light-emitting diode boards of the lighting system according to one example of the present disclosure.

FIG. 4 shows an example of a light-emitting diode ("LED") lighting system 400, along with a table 402 showing a power bus impedance of LED boards of the lighting system 400 according to one example of the present disclosure. In the example depicted in FIG. 4, the lighting system 400 includes four LED boards. Each LED board can include at least one LED. The LEDs on each LED board can be arranged in series, in parallel, or a combination of series and parallel arrangements. In this example, the LED boards are connected to a power source via an LED driver that regulates power from the power source to the LED boards.

In this example, the LED boards are arranged so that connecting a positive output of the LED driver to a positive input of a first LED board and connecting a negative output of the LED driver to a negative output of a last LED board can allow power or current from the power source to be distributed approximately evenly across the LED boards. For example, connecting the positive output of the LED driver to the positive input of the first LED board and connecting the negative output of the LED driver to the negative output of the last LED board can balance the current through the LED boards. As an example, connecting the positive output of the LED driver to the positive input of the first LED board and connecting the negative output of the LED driver to the negative output of the last LED board can cause a power bus impedance to be the same across each LED board of the lighting system 400. The power bus impedance can be the additional impedance for each LED board beyond the impedance through the LEDs on the LED board. As shown in the table 402, the power bus impedance for each of the LED boards is similar.

Figure 5:
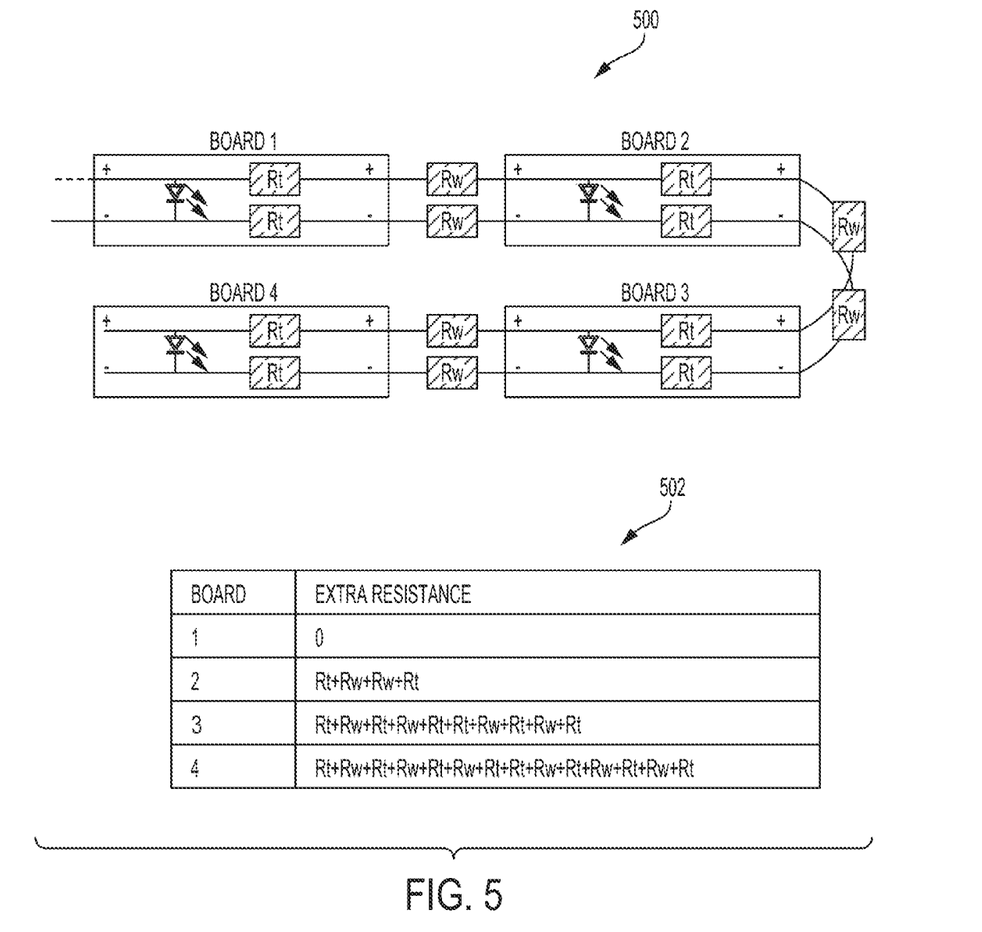
FIG. 5 shows an example of a prior art system, along with a table showing a power bus impedance of light-emitting diode boards of the prior art system.

FIG. 5 shows an example of a prior art system 500, along with a table 502 showing a power bus impedance of the LED boards of the prior art system 500. In the example depicted in FIG. 5, the prior art system 500 includes four LED boards. As shown in the table 502, the power bus impedance for each of the LED boards is different.

Figure 1:
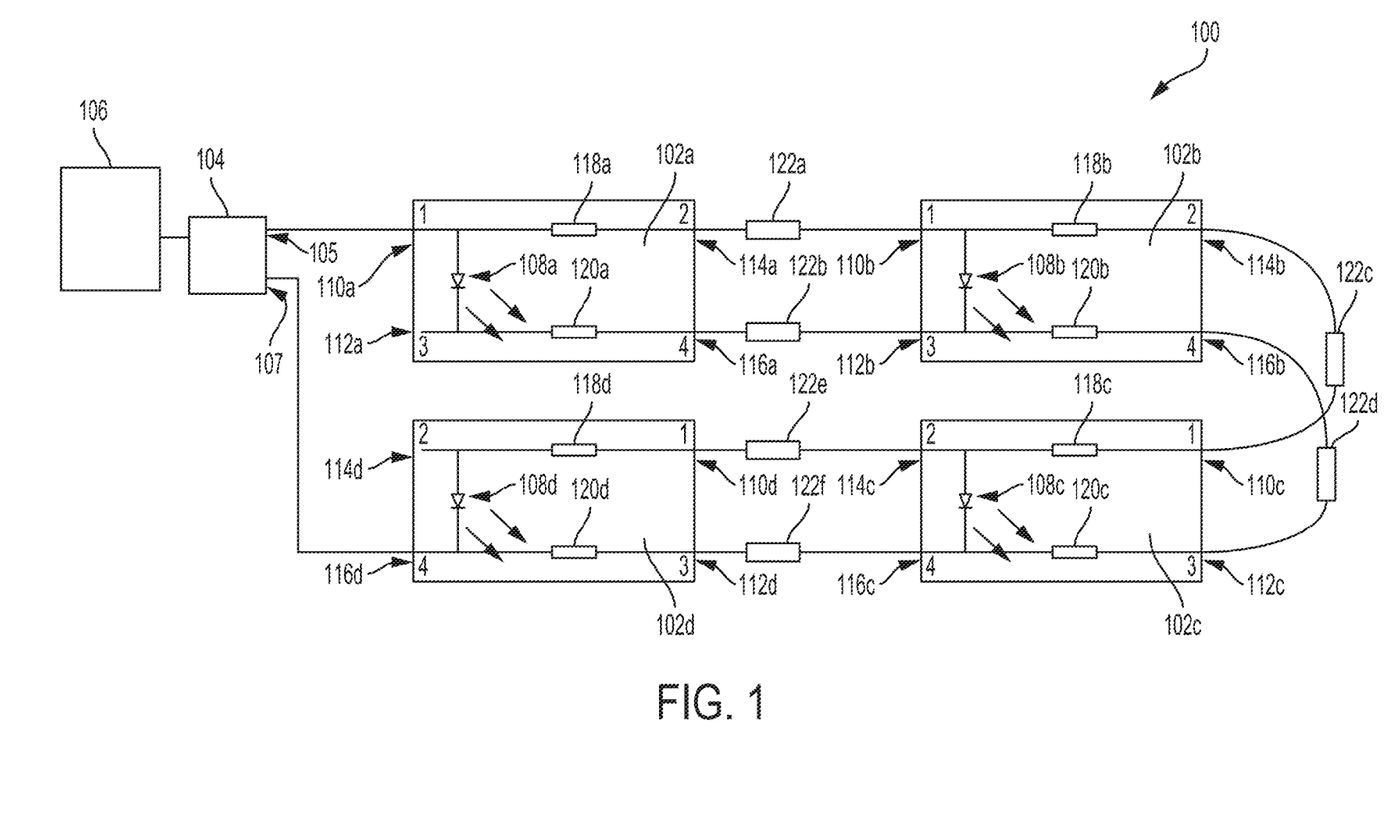
FIG. 1 is a block diagram of an example of a light-emitting diode lighting system according to one example of the present disclosure.

FIG. 1 is a block diagram of an example of a LED lighting system 100 according to one example of the present disclosure. In the example depicted in FIG. 1, the system 100 includes LED boards 102a-d. Each LED board 102a-d can be housed in a fixture. In some examples, the LED boards 102a-d can be housed in a single fixture or can each be housed in a separate fixture. Each of the LED boards 102a-d can include one or more LEDs 108a-d that can be arranged or configured in series, in parallel, or a combination of series and parallel arrangements on the LED boards 102a-d. In some examples, the LED boards 102a-d can be configured in substantially the same manner. For example, each LED board 102a-d can include substantially the same number of LEDs 108a-d and the LEDs 108a-d on each LED board 102a-d can be arranged in substantially the same manner. In another example, the various LED boards 102a-d can have different configurations. For example, each LED board 102a-d can have a different number of LEDs 108a-d or the LEDs 108a-d on each LED board 102a-d can be arranged differently.

The system 100 also includes an LED driver 104 that is connected to a power source 106, such as a line voltage or a power supply, which can provide power for operating one or more components of the system 100. As an example, the power source 106 can provide an alternating current for operating the LED boards 102a-d. The LED driver 104 can be connected to the power source 106 and the LED boards 102a-d to provide or regulate power to each of the LED boards 102a-d.

The LED driver 104 has a first output 105 (also referred to herein as a positive output) and a second output 107 (also referred to herein as a negative output). The LED board 102a can include a first power connection point 110a (also referred to herein as a positive input), a second power connection point 114a (also referred to herein as a positive output), a third power connection point 112a (also referred to herein as a negative input), and a fourth power connection point 116a (also referred to herein as a negative output). Each of the LED boards 102b-d includes a first power connection point (or positive input) 110b-d, a second power connection point (or positive output) 114b-d, a third power connection point (or negative input) 112b-d, and a fourth power connection point (or negative output) 116b-d.

In this example, the LED driver 104 is connected to the power source 106 and receives power from the power source 106. The positive output 105 of the LED driver 104 is connected to the positive input 110a of the LED board 102a and the negative output 107 of the LED driver 104 is connected to the negative output 116d of the LED board 102d.

The positive output 114a of the LED board 102a is connected to the positive input of the 110b of the LED board 102b and the positive output 114b of the LED board 102b is connected to the positive input 110c of the LED board 102c. The positive output 114c of the LED board 102c is connected to the positive input 110d of the LED board 102d. In this example, the negative input 112d of the LED board 102d is connected to the negative output 116c of the LED board 102c and the negative input 112c of the LED board 102c is connected to the negative output 116b of the LED board 102b. The negative input 112b of the LED board 102b is connected to the negative output 116a of the LED board 102a. As shown in the example of FIG. 1, the LED boards 102a-d can be connected between the positive output 104 of the LED driver 104 and the negative output 107 of the LED driver 104. In this example, connecting the LED boards 102a-d can allow power or current provided by the power source 106 via the LED driver 104 to flow through the LED boards 102a-d.

Various components of the system 100 can have an impedance (e.g., a resistance to current passing through the system 100) and the impedance of each component may affect the current passing through the system 100. As an example, each LED board 102a-d can include one or more conductors or traces (e.g., a copper trace) that has a trace impedance 118a-d and 120a-d. In the example depicted in FIG. 1, each conductor can be connected between positive or negative inputs and outputs of each LED board 102a-d. As an example, a conductor can be positioned on the LED board 102a between the positive input 110a of the LED board 102a and the positive output 114a of the LED board 102a and the conductor can have a trace impedance 118a. Another conductor can be positioned on the LED board 102a between the negative input 112a and the negative output 116a of the LED board 102a and the conductor can have a trace impedance 120a. In some examples, the system 100 can include wires or other inter-board connectors or conductors for connecting the LED boards 102a-d. In such examples, the wires have a wire impedance 122a-f. In some examples, the impedance of each trace or wire in the system 100 can be the same or may be different, but may still fall within a range of acceptable values. As an example, the trace impedance 118a-d and 120a-d may each be the same or may vary within an acceptable range. As another example, each wire impedance 122a-f may be the same or may be different, but still fall within an acceptable range. In some examples, the trace impedance 118a-d and 120a-d and the wire impedance 122a-f may vary based on any number of factors including, for example, a material of a trace on an LED board 102a-d, a material of a wire used to connect LED boards 102a-d, or any other factor.

In the example of FIG. 1, the LED boards 102a-d are arranged so that connecting the positive output 105 of the LED driver 104 to the positive input 110a of the LED board 102a and connecting the negative output 107 of the LED driver 104 to the negative output 116d of the LED board 102d can allow power or current from the power source 106 to be distributed approximately evenly across the LED boards 102a-d (e.g., substantially the same across the LED boards 102a-d). For example, connecting the positive output 105 of the LED driver 104 to the positive input 110a of the LED board 102a and connecting the negative output 107 of the LED driver 104 to the negative output 116d of the LED board 102d can balance the current through the LED boards 102a-d. As an example, connecting the positive output 105 of the LED driver 104 to the positive input 110a of the LED board 102a and connecting the negative output 107 of the LED driver 104 to the negative output 116d of the LED board 102d can balance the current by balancing the trace impedance 118a-d and 120a-d and the wire impedance 122a-f in the system 100. For example, connecting the positive output 105 of the LED driver 104 to the positive input 110a of the LED board 102a and connecting the negative output 107 of the LED driver 104 to the negative output 116d of the LED board 102d can cause a power bus impedance to be the same across each LED board 102a-d. The power bus impedance can be the additional impedance for each LED board beyond the impedance through the LEDs on the LED board. The power bus impedance can be the sum of impedances of the relevant trace impedances and the relevant wire impedances.

As an example, the power bus impedance of the LED board 102a can be the sum of the relevant trace and wire impedances, as shown below:

(120a+122b+120b+122d+120c+122f+120d).

The power bus impedance of LED board 102a is similar to the power bus impedance of the remaining LED boards 102b-d. For example, the power bus impedance for LED board 102d can be the sum of the relevant trace and wire impedances as shown below:

(118a+122a+118b+122c+118c+122e+118d).

When the trace impedances are similar for the conductors on each LED board that connect the positive input and output (e.g., 110a and 114a) and the negative input and output (e.g., 112a and 116a) and the wire impedances for each of the wires or inter-board conductors that connect the LED boards are similar (e.g., 122a and 122b), then the power bus impedance for each of the LED boards is similar. For each LED board shown in FIG. 1, the power bus impedance can be represented by: 4×(trace impedance)+3×(wire impedance). More generally, where there are n LED boards the power bus impedance can be represented by: n×(trace impedance)+(n−1)×(wire impedance).

Figure 3:
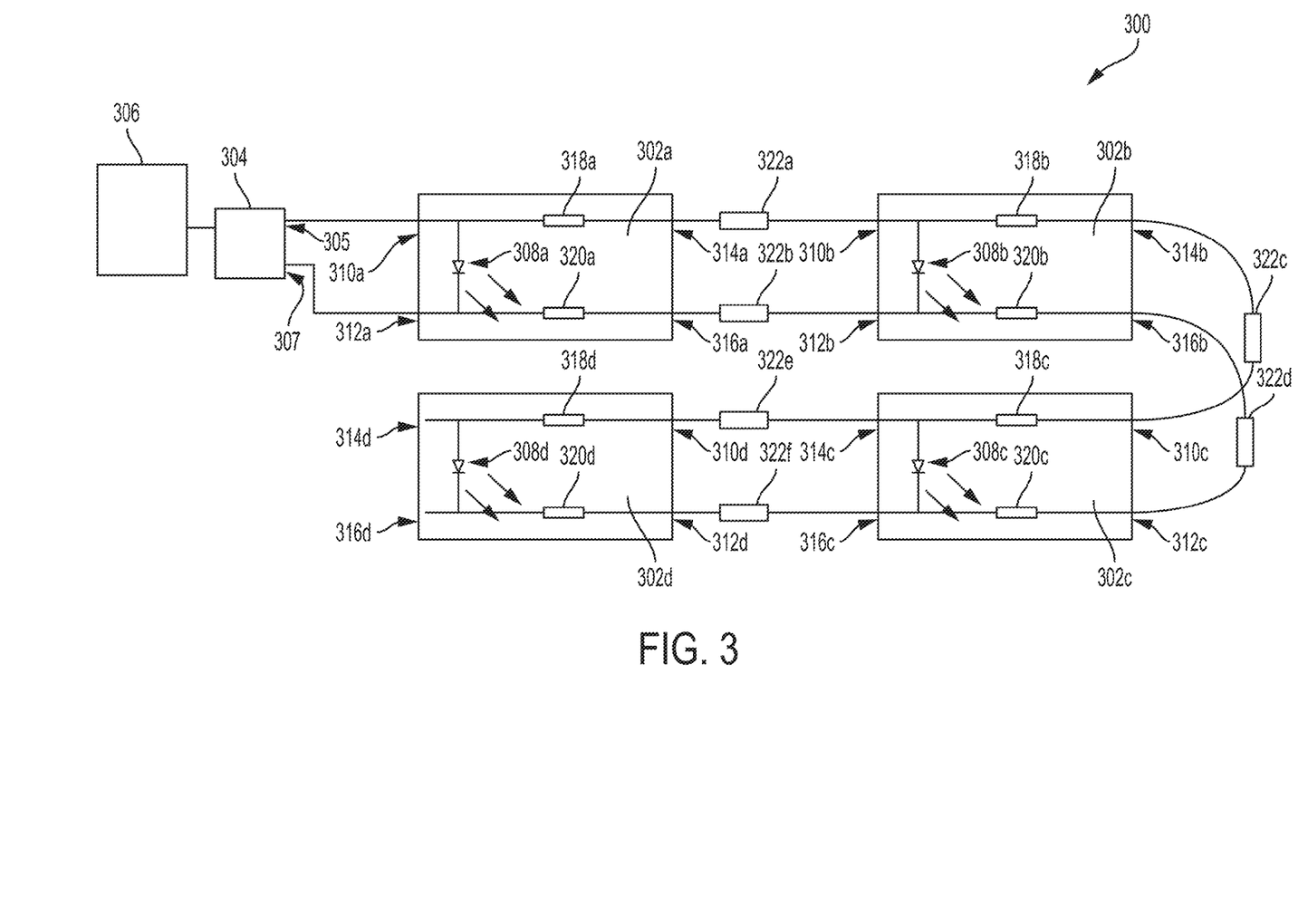
FIG. 3 is a block diagram of a prior art system.

FIG. 3 is a block diagram of a prior art system 300. FIG. 3 illustrates the problem with the prior art configuration. The system 300 includes LED boards 302a-d each of which can be configured in substantially the same manner as LED boards 102a-d of FIG. 1, although they need not be. For example, each LED 302a-d includes a first power connection point (or positive input) 310a-d, a second power connection point (or positive output) 314a-d, a third power connection point (or negative input) 312a-d, and a fourth power connection point (or negative output) 316a-d. The system 300 also includes an LED driver 304 that is connected to a power source 306, which can be configured in substantially the same manner as LED driver 104 and power source 106 of FIG. 1, respectively, although they need not be. The LED driver 304 has a first output 305 and a second output 307.

In the example depicted in FIG. 3, the power bus impedance for LED board 302a is 0 and the power bus impedance for LED board 302d is: 318a+322a+318b+322c+318c+322e+318d+322f+320d+322c+322d+320b+322b+320a. This difference in power bus impedance results in a different amount of power or current being supplied to the LED boards and may result in differences in brightness or intensity.

Returning to FIG. 1, although the example LED lighting system 100 of FIG. 1 is depicted as having a certain number of components, in other examples, the LED lighting system 100 has any number of additional or alternative components. For example, the LED lighting system 100 can include one or more terminating connectors. A terminating connector can be connected to a positive or negative input or output of the LED board 102a or 102d. In other examples, control signals may be provided to the LED driver 104 to control the outputs of the LED driver to produce lighting effects, such a dimming. In some examples, a housing can accommodate the various components of the LED lighting system 100 of FIG. 1. As an example, the housing can accommodate the LED boards 102a-d, the LED driver 104, and the various wires, connectors, conductors, inter-board connectors, etc. As another example, while the example depicted in FIG. 1 shows a lighting system 100 that includes four LED boards 102a-d, any number of LED boards may be included in the lighting system 100. For example, the lighting system 100 may include two or more LED boards.

Figure 2:
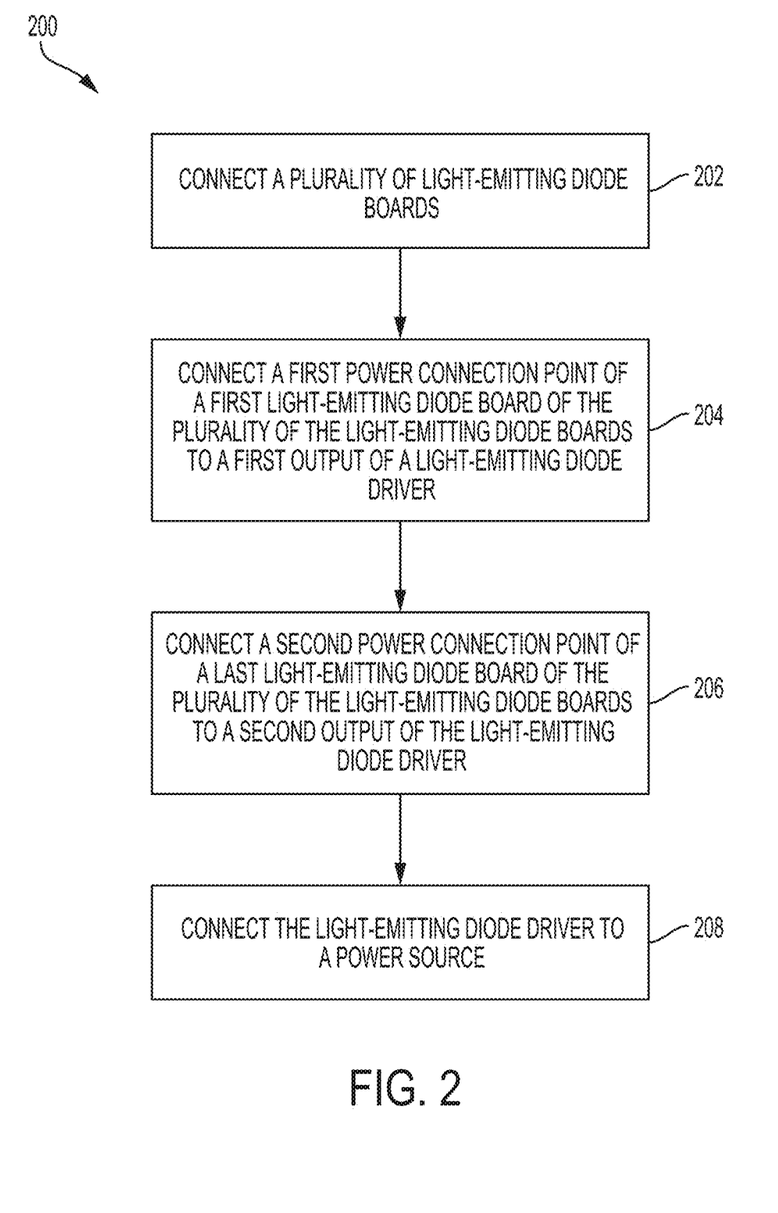
FIG. 2 is a flow chart depicting an example of a process for configuring a light-emitting diode lighting system according to one example of the present disclosure.

FIG. 2 is a flow chart depicting an example of a process 200 for configuring a light-emitting diode lighting system according to one example of the present disclosure. The process 200 of FIG. 2 will be described with respect to the example system 100 shown in FIG. 1; however, the process is not limited to such a system 100. Rather, the process 200 may be performed with any suitable lighting system according to this disclosure.

At step 202, a plurality of LED boards 102a-d are connected. Each LED board 102a-d includes one or more LEDs 108a-d. The LED boards 102a-d can be electrically connected via wires or connectors. Each of the LED boards 102a-d includes a first power connection point (or positive input) 110a-d, a second power connection point (or positive output) 114a-d, a third power connection point (or negative input) 112a-d, and a fourth power connection point (or negative output) 116a-d.

At step 202, the positive output 114a of the LED board 102a is connected to the positive input of the 110b of the LED board 102b and the positive output 114b of the LED board 102b is connected to the positive input 110c of the LED board 102c. The positive output 114c of the LED board 102c is connected to the positive input 110d of the LED board 102d. In this example, the negative input 112d of the LED board 102d is connected to the negative output 116c of the LED board 102c and the negative input 112c of the LED board 102c is connected to the negative output 116b of the LED board 102b. The negative input 112b of the LED board 102b is connected to the negative output 116a of the LED board 102a.

At step 204 a power connection point of a first LED board of the plurality of LED boards 102a-d is connected to a first output of a LED driver 104. For example, the LED driver 104 has a first output 105 (or a positive output) and a second output 107 (or a negative output). The positive output 105 of the LED driver 104 is connected to the positive input 110a of the LED board 102a.

At step 206 a power connection point of a last LED board of the plurality of LED boards 102a-d is connected to a second output of the LED driver 104. For example, the negative output 107 of the LED driver 104 is connected to the negative output 116d of the LED board 102d.

At block 208, the LED driver is connected to a power source 106. For example, the LED driver 104 is connected to a power source 106, such as a line voltage or a power supply, which can provide power for operating one or more of the LED boards 102a-d. As an example, the power source 106 can provide an alternating current for operating the LED boards 102a-d. The LED driver 104 can be connected to the power source 106 and the LED boards 102a-d to provide or regulate power to each of the LED boards 102a-d.

In some examples, the LED boards 102a-d can be electrically connected between the positive output 105 of the LED driver 104 and the negative output 107 of the LED driver 104. In some examples, connecting the positive output 105 of the LED driver 104 to the positive input 110a of the LED board 102a (e.g., at step 204) and connecting the negative output 107 of the LED driver 104 to the negative output 116d of the LED board 102d (e.g., at step 206) allows power or current from the power source 106 to be distributed approximately evenly across the LED boards 102a-d (e.g., substantially the same across the LED boards 102a-d). For example, connecting the positive output 105 of the LED driver 104 to the positive input 110a of the LED board 102a and connecting the negative output 107 of the LED driver 104 to the negative output 116d of the LED board 102d can balance the current through the LED boards 102a-d. As an example, connecting the positive output 105 of the LED driver 104 to the positive input 110a of the LED board 102a and connecting the negative output 107 of the LED driver 104 to the negative output 116d of the LED board 102d can balance the current by balancing a power bus impedance based on trace impedances 118a-d and 120a-d and wire impedances 122a-f in the system 100. In this example, the trace impedances 118a-d and 120a-d and the wire impedances 122a-f can be the same or within an acceptable range for each type of impedance. In some examples, distributing the power approximately evenly across the LED boards 102a-d or balancing the current through the LED boards 102a-d can cause a brightness or intensity of each of the LEDs 108a-d to be approximately the same.

In some examples, connecting the positive output 105 of the LED driver 104 to the positive input 110a of the LED board 102a and connecting the negative output 107 of the LED driver 104 to the negative output 116d of the LED board 102d to distribute power or current evenly across the LED boards 102a-d can obviate the use of a splitter or additional components for distributing power or current evenly across the LED boards 102a-d.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A light-emitting diode lighting system comprising:
a plurality of light-emitting diode ("LED") boards, wherein each LED board comprises at least one LED and each LED board includes a first conductor connected between a first connection point and a second connection point of the LED board and having a first impedance and a second conductor connected between a third connection point and a fourth connection point of the LED board and having a second impedance, and the LED is connected between the first conductor and the second conductor;
a plurality of inter-board conductors for connecting the LED boards, each inter-board conductor having a third impedance; and
an LED driver comprising a first LED driver output, a second LED driver output, and an LED driver input configurable for connection to a power source,
wherein the first LED driver output is connected to the first connection point of a first LED board and the second LED driver output is connected to the fourth connection point of a last LED board, and
wherein a first inter-board conductor connects the second connection point of the first LED board to a first connection point of an intervening LED board, a second inter-board conductor connects the second connection point of the intervening LED board to the first connection point of the last LED board, a third inter-board conductor connects the fourth connection point of the first LED board to the third connection point of the intervening LED board, and a fourth inter-board conductor connects the fourth connection point of the intervening LED board to the third connection point of the last LED board.

2. The system of claim 1, further comprising a housing that accommodates the LED driver, the LED boards, and the inter-board conductors.

3. The system of claim 1, wherein a power bus impedance for the first LED board is a sum of the second impedance of the first LED board, the third impedance of the third inter-board conductor, the second impedance of the intervening LED board, the third impedance of the fourth inter-board conductor, and the second impedance of the last LED board and wherein each LED board has a substantially equal power bus impedance.

4. The system of claim 1, wherein at least one of the LED boards has a plurality of LEDs and a portion of the plurality of LEDs is connected in series.

5. The system of claim 1, wherein at least one of the LED boards has a plurality of LEDs and a portion of the plurality of LEDs is connected in parallel.

6. A method for balancing current among a plurality of light-emitting diode boards, the method comprising:
connecting a plurality of LED boards, wherein each LED board comprises at least one LED and each LED board includes a first conductor connected between a first connection point and a second connection point of the LED board and having a first impedance and a second conductor connected between a third connection point and a fourth connection point of the LED board and having a second impedance, and the LED is connected between the first conductor and the second conductor, and wherein connecting the plurality of LED boards comprises:
connecting the second connection point of a first LED board to the first connection point of an intervening LED board via a first inter-board conductor;
connecting the second connection point of the intervening LED board to the first connection point of a last LED board via a second inter-board conductor;
connecting the fourth connection point of the first LED board to the third connection point of the intervening LED board via a third inter-board conductor; and
connecting the fourth connection point of the intervening LED board to the third connection point of the first LED board via a fourth inter-board conductor, wherein each inter-board conductor has a third impedance;
connecting the first LED board to an LED driver by connecting a first LED driver output of the LED driver to the first connection point of the first LED board; and
connecting the last LED board to the LED driver by connecting a second LED driver output of the LED driver to the fourth connection point of the last LED board, and wherein the LED driver comprises an LED driver input configurable for connection to a power source.

7. The method of claim 6, wherein a power bus impedance for the first LED board is a sum of the second impedance of the first LED board, the third impedance of the third inter-board conductor, the second impedance of the intervening LED board, the third impedance of the fourth inter-board conductor, and the second impedance of the last LED board.

8. The method of claim 6, wherein the plurality of LED boards comprises a plurality of LEDs and wherein at least a portion of the plurality of LEDs on the LED boards is connected in series.

9. The method of claim 6, wherein the plurality of LED boards comprises a plurality of LEDs and wherein at least a portion of the plurality of LEDs on the LED boards is connected in parallel.

10. The method of claim 6, further comprising powering the LED boards by the LED driver.

11. A light-emitting diode lighting system comprising:
a plurality of light-emitting diode ("LED") boards, wherein each LED board comprises a plurality of LEDs and each LED board includes a first conductor having a first impedance and connected between a first connection point and a second connection point of the LED board, and a second conductor having a second impedance and connected between a third connection point and a fourth connection point of the LED board, and the LEDs are connected between the first conductor and the second conductor;
a plurality of inter-board conductors for connecting the LED boards, each inter-board conductor having a third impedance; and
an LED driver comprising a first LED driver output, a second LED driver output, and an LED driver input configurable for connection to a power source,
wherein the first LED driver output is connected to the first connection point of a first LED board of the plurality of LED boards and the second LED driver output is connected to the fourth connection point of a last LED board of the plurality of LED boards, and
wherein the LED boards are connected by a first set of inter-board conductors that connect the first conductors of the LED boards and a second set of inter-board conductors that connect the second conductors of the LED boards.

12. The system of claim 11, wherein the system includes an intervening LED board and the first set of inter-board conductors includes a first inter-board conductor that connects the second connection point of the first LED board to a first connection point of the intervening LED board and a second inter-board conductor that connects the second connection point of the intervening LED board to the first connection point of the last LED board.

13. The system of claim 12, wherein the second set of inter-board conductors includes a third inter-board conductor that connects the fourth connection point of the first LED board to the third connection point of the intervening LED board and a fourth inter-board conductor that connects the fourth connection point of the intervening LED board to the third connection point of the last LED board.

14. The system of claim 11, wherein the system includes at least one intervening LED board, and the first set of inter-board conductors includes a first inter-board conductor that connects the second connection point of the first LED board to a first connection point of a first one of the intervening LED boards and a second inter-board conductor that connects the second connection point of a last one of the intervening LED boards to the first connection point of the last LED board.

15. The system of claim 14, wherein the second set of inter-board conductors includes a third inter-board conductor that connects the fourth connection point of the first LED board to the third connection point of the first intervening LED board and a fourth inter-board conductor that connects the fourth connection point of the last intervening LED board to the third connection point of the last LED board.

16. The system of claim 15 further comprising additional inter-board conductors to connect the first conductors of intervening LED boards located between the first intervening LED board and the last intervening LED board and to connect the second conductors of the intervening LED boards between the first intervening LED board and the last intervening LED board.

17. The system of claim 13 wherein a power bus impedance for the first LED board is a sum of the second impedance of the first LED board, the third impedance of the third inter-board conductor, the second impedance of the intervening LED board, the third impedance of the fourth inter-board conductor, and the second impedance of the last LED board and a power bus impedance for the last LED board is a sum of the first impedance of the first LED board, the third impedance of the first inter-board conductor, the first impedance of the intervening LED board, the third impedance of the second inter-board conductor, and the first impedance of the last LED board.

18. A light-emitting diode lighting system comprising:
a first light-emitting diode ("LED") board comprising at least one LED;
a second LED board comprising at least one LED, wherein each of the first LED board and the second LED board includes a first conductor connected between a first connection point and a second connection point of the LED board and having a first impedance and a second conductor connected between a third connection point and a fourth connection point of the LED board and having a second impedance, and the at least one LED of the first LED board is connected between the first conductor and the second conductor of the first LED board and the at least one LED of the second LED board is connected between the first conductor and the second conductor of the second LED board;
a plurality of inter-board conductors for connecting the first and second LED boards, each inter-board conductor having a third impedance; and
an LED driver comprising a first LED driver output, a second LED driver output, and an LED driver input configurable for connection to a power source,
wherein the first LED driver output is connected to the first connection point of the first LED board and the second LED driver output is connected to the fourth connection point of the second LED board, and
wherein a first inter-board conductor connects the second connection point of the first LED board to the first connection point of second LED board, a second inter-board conductor connects the fourth power connection point of the first LED board to the third power connection point of the second LED board.

19. The system of claim 18, wherein the first and the second LED boards each include a plurality of LEDs and a number and arrangement of the plurality of LEDs on the first LED board matches a number and arrangement of the plurality of LEDs on the second LED board.

20. The system of claim 18, wherein the first and the second LED boards each include a plurality of LEDs and a number and arrangement of the plurality of LEDs on the first LED board differ from a number or arrangement of the plurality of LEDs on the second LED board.

\* \* \* \* \*